US006270822B1

(12) United States Patent
Frazier

(10) Patent No.: US 6,270,822 B1
(45) Date of Patent: Aug. 7, 2001

(54) METHODS FOR REMOVAL OF CHLORINE FROM WATER

(75) Inventor: Stephen Earl Frazier, Lake Mary, FL (US)

(73) Assignee: Tekquest Industries, Sanford, FL (US)

( * ) Notice: Subject to any disclaimer, the term of this patent is extended or adjusted under 35 U.S.C. 154(b) by 0 days.

(21) Appl. No.: 09/179,650

(22) Filed: Oct. 27, 1998

Related U.S. Application Data
(60) Provisional application No. 60/063,340, filed on Oct. 27, 1997.

(51) Int. Cl.[7] ................................. A23F 5/00; C02F 1/28
(52) U.S. Cl. .......................... 426/433; 210/679; 210/282
(58) Field of Search ................................. 210/679, 694, 210/282; 426/433

(56) References Cited

U.S. PATENT DOCUMENTS

| | | | |
|---|---|---|---|
| 4,119,019 | * 10/1978 | Reid | 99/306 |
| 4,707,263 | * 11/1987 | Nishimori et al. | 210/282 |
| 4,749,481 | * 6/1988 | Wheatley | 210/282 |
| 5,393,548 | * 2/1995 | Heiligman | 210/282 |
| 5,505,120 | * 4/1996 | Albertson | 210/282 |
| 5,538,629 | * 7/1996 | Blaney et al. | 210/198.1 |

* cited by examiner

Primary Examiner—Ivars Cintins
(74) Attorney, Agent, or Firm—Allen, Dyer, Doppelt, Milbrath & Gilchrist, P.A.

(57) ABSTRACT

The present invention discloses a device for removing chlorine from chlorinated potable water. The device contains a chlorine adsorptive material selected from the group consisting of cellulose, activated carbon, or activated carbon with an enhanced adsorptive capacity for chlorine. A method for enhancing the adsorptive affinity of activated carbon for chlorine in potable water is also disclosed. By pretreating ordinary activated carbon with one of several agents, including potassium iodide, ammonium carbonate and ammonium sulfate, the activated carbon, which is minimally active for chlorine reduction, is rendered highly active and able to be applied in much smaller quantities than presently known in the art. Also disclosed is the use of activated carbon in zero-pressure-drop devices instead of filters requiring a pressure differential. Commercial applications include potable water taste improvement without filtration, water preparation for storage pitchers and the like which do not require filtration, devices which remove chlorine from make-up water for concentrated juices, devices which remove chlorine from water for coffee and tea, and other applications as will come to mind to one of ordinary skill in the art, for example removal of chlorine from water to be used for holding tropical fish, fresh water bait fish, and related applications. Accordingly, the present invention advantageously provides a device and associated methods for removal of chlorine from potable water without the use of a filter.

23 Claims, 2 Drawing Sheets

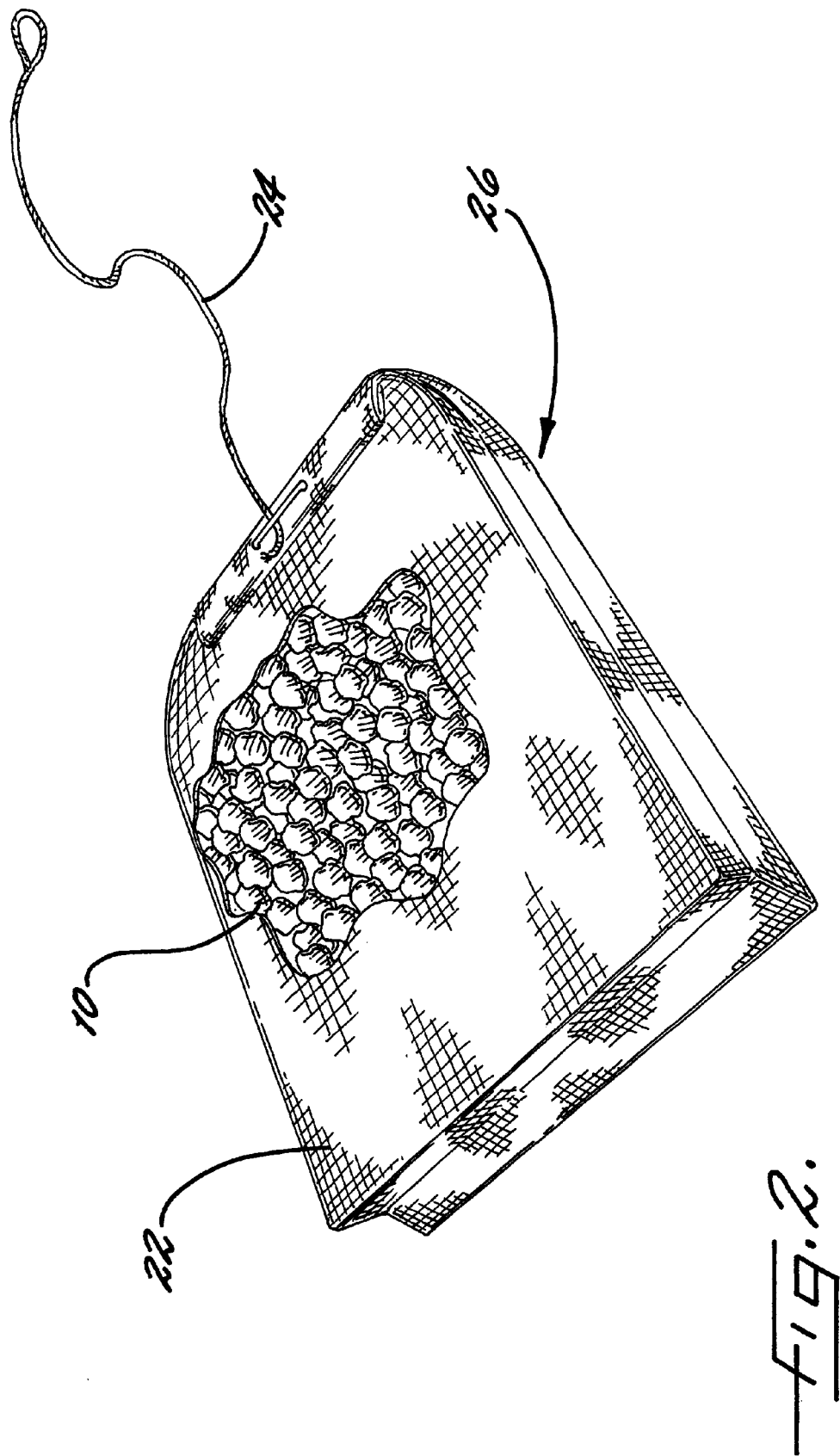

METHODS FOR REMOVAL OF CHLORINE FROM WATER

This Application is a Continuation-in-Part of Provisional Patent Application No. 60/063,340 Filed on Oct. 27, 1997.

FIELD OF THE INVENTION

The present invention relates to the field of potable water and more specifically to providing potable water having an improved taste through the use of a device and method for substantially removing chlorine from the water.

BACKGROUND OF THE INVENTION

Conventional practice for removing chlorine disinfectant from chlorinated potable water calls for the filtration of water through a filter bed, usually activated carbon or charcoal. In this process the water sample is required to make intimate and relatively extended contact with the filter medium. In addition, a filtration process has a number of physical requirements which make it best suited for application to dedicated, stand-alone appliances for the production of chlorine-free water.

One requirement of a filtration method imposed by the physics involved is a measurable pressure drop through the filter bed, which restricts the rate of flow and sometimes requires the application of external pressure to force the liquid through the filter at a practical flow rate. In addition, to achieve the contact time required for complete reaction, conventional filters tend to be disposed with large volumes of filter medium. More compact filters, incorporating a smaller volume of active ingredient require a slower water flow rate to maximize contact time and, therefore, optimize chlorine removal.

Another disadvantage of filtration systems relates to biological contamination of the filter bed. Potable water, however clean, always carries some microorganisms, including bacteria. Filtration devices using activated carbon remove not only chlorine but also other organic and inorganic components found in water. These components serve as nutrients for bacteria and other microorganisms in the water. Because these filters usually retain water during periods of non-use, they provide ideal environments for growth of waterborne bacteria on the nutrients that have been accumulated in the filter bed. During periods of non-use of the filter, the bacteria and other microorganisms multiply rapidly within the filter material until they are flushed out during the next use of the device. Following a period of non-use, the first sample of water to pass through the filter will usually be heavily laden with bacteria. Incorporation of a filtration system in a device which is used intermittently, for example an automatic coffee maker, will expose the user to such bacterial contamination. Even if the bacteria are destroyed by subsequent heating of the water, as might occur in the automatic coffee maker, a variety of toxic products are released from the bacterial cells during their destruction and these harmful bacterial byproducts will be in the water used for the beverage.

SUMMARY OF THE INVENTION

The present invention relates to removal of chlorine from drinking water to improve its taste when being used for preparation of beverages. The present invention discloses the use of activated carbon in zero-pressure-drop devices instead of filters requiring a pressure differential. Commercial applications include potable water taste improvement without filtration, water preparation and storage pitchers and the like which do not require filtration, devices which remove chlorine from make-up water for concentrated juices, devices which remove chlorine from water for coffee and tea, and other applications as will come to mind to one of ordinary skill in the art, for example removal of chlorine from water to be used for holding tropical fish, fresh water bait fish, and other related applications.

Additionally, a method to enhance the adsorptive affinity of activated carbon for chlorine in potable water is disclosed. Ordinary activated carbon, which is minimally active for chlorine reduction, is rendered highly active and able to be applied in much smaller quantities than presently known in the art. Accordingly, with the foregoing in mind, the present invention advantageously provides a device and associated methods for removal of chlorine from potable water without the use of a filter.

It is, therefore, an object of the present invention to provide a device usable for substantially removing chlorine from potable water without the need for filtration.

It is a further object of the present invention to provide a chlorine removal device for potable water using cellulose as the adsorbent.

It is another object of the present invention to provide a method for producing enhanced activated carbon having an increased adsorptive capacity for chlorine.

It is a further object of the present invention to provide a chlorine removal device using enhanced activated carbon.

It is yet another object of the present invention to provide a disposable device for chlorine removal from potable water employing cellulose as the adsorbent.

It is another object of the present invention to provide a disposable product for chlorine removal from potable water employing enhanced activated carbon as the adsorbent.

It is still another object of the present invention to provide an automatic coffee maker having a chlorine removal device incorporated in its water reservoir to substantially dechlorinate water for making coffee.

It is a further object of the present invention to provide an easily portable, disposable chlorine removal device that may be used anywhere for conveniently providing substantially dechlorinated potable water.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 2 is an illustration of the disposable bag embodiment of the chlorine removal device. Like a conventional tea bag, this embodiment is easily portable for use anywhere.

DETAILED DESCRIPTION OF PREFERRED EMBODIMENTS

Figure 3:
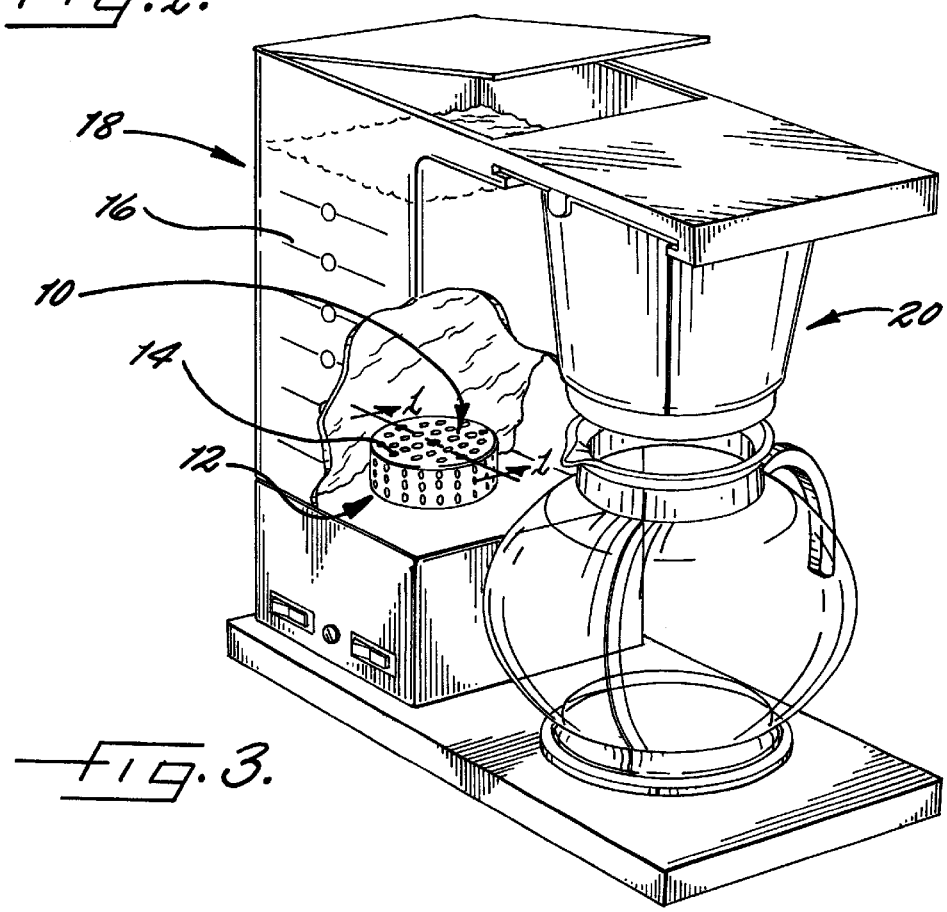
FIG. 3 is an illustration of an automatic coffee maker with the chlorine removal device in place within the water reservoir container.

The present invention will now be described more fully hereinafter with reference to the accompanying drawings which illustrate preferred embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, the prime notation, if used, indicates similar elements in alternative embodiments. Preferred embodiments will be discussed with reference to FIGS. 1–3.

Figure 1:
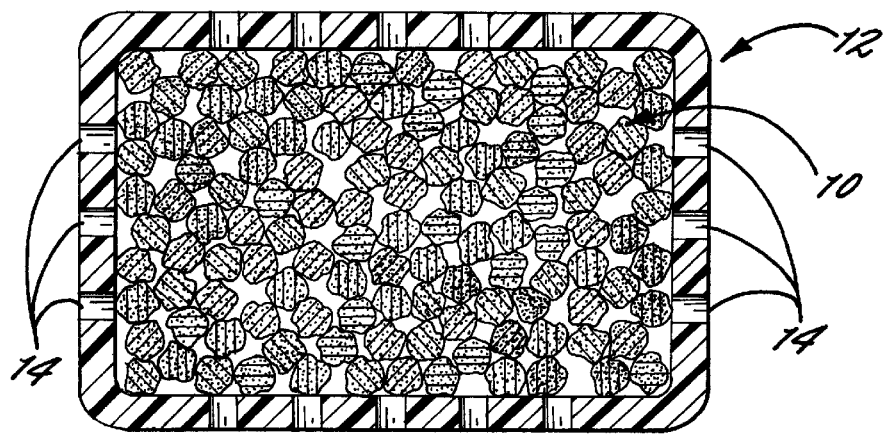
FIG. 1 is a cross sectional top view of a container for holding the chlorine adsorbent material. The container illustrated is a water permeable device, in this illustration it consists of a plastic cage having pores of sufficient size to allow the free flow of water through the device, yet sufficiently small to securely contain the adsorbent material.

FIG. 1 illustrates a water permeable device 12 to hold a quantity of an adsorbent 10 for substantially removing chlorine from potable water. The device is used by immersing it in the water sample to be dechlorinated and allowing sufficient time for the adsorbent 10 to chemically remove chlorine. The device may be disposed with retrieval means such as a string, or a handle for aiding retrieval from the water. When disposed with a handle, the device may resemble a large swizzle stick. In addition, while the device illustrated in FIG. 1 embodies a particular shape, those skilled in the art will appreciate that the device may be made in any number of shapes, including shapes having an overall ornamental appearance, for example, a fish. Preferred adsorbents 10 include activated carbon, cellulose and activated carbon with increased adsorbency for chlorine effected through the process herein below described.

Conventional methods of removing chlorine from chlorinated potable water include filtration with activated charcoal or carbon, and reaction of chlorine with various combinations of metal catalysts. It was observed that when chlorinated water is in contact with organic matter such as polymeric ion exchange resins, or simple molecules such as dextrose, the chlorine content was quickly reduced. The use of chlorine to treat and bleach natural materials such as lignin and cellulose is well known in the art, however, there are no suggestions or teachings in which a material such as cellulose is used to reduce chlorine in drinking water.

A preferred embodiment of the present invention includes the use of cellulose as the adsorbent 10 for substantially reducing the amount of chlorine in chlorinated potable water. To test this approach, several types of cellulose-containing materials, including waste products from paper recycling, from wood production and from an agricultural process (e.g. corn cobs), were obtained and tested for their ability to remove chlorine from drinking water. Data obtained when using corn cob derived cellulose are presented in the following examples.

EXAMPLE 1

About 25 grams of dry ground corn cob cellulose was placed in a water permeable device 12, in this example a plastic cage through which water could flow freely, as shown in FIG. 1. The cage was placed in the water reservoir 18 of an automatic coffee maker 20 with a capacity for between 2 and 12 cups, such as that shown in FIG. 3. Water containing 2.0 ppm (parts per million) of chlorine as $OCl^-$ was added to the reservoir 18. The contact time in the reservoir 18 was approximately nine (9) minutes. The volume of each brewing cycle was 2.8 liters (12 cups), the full capacity of the machine. Following each brewing cycle the chlorine content of the water in the coffee pot was measured. Measurements taken after several brewing cycles are shown in Table 1.

TABLE 1

| Brew Cycle Completed | Chlorine Reduction |
| --- | --- |
| 1 | 99% |
| 13 | 83% |
| 17 | 85% |
| 47 | 54% |
| 67 | 58% |
| 81 | 73% |
| 100 | 50% |
| 128 | 51% |

EXAMPLE 2

Approximately 16 grams of ground corncob cellulose was placed in a water permeable device 12, as shown in FIG. 2 this is a plastic cage through which water could flow freely. The cage was again placed in the reservoir 18 of a 12 cup coffee brewer 20, as described above with reference to FIGS. 1 and 3, and water containing 2.0 ppm chlorine as $OCl^-$ was used to fill the reservoir 18. The contact time in the reservoir was approximately nine (9) minutes. The volume of water 16 used for each brewing cycle was 2.8 liters (12 cups), the full capacity of the machine. Chlorine content in the brewed water was measured following each cycle and for several cycles. These data are reported by way of example in Table 2 below.

TABLE 2

| Brew Cycle Completed | Chlorine Reduction |
| --- | --- |
| 20 | 94% |
| 30 | 68% |
| 40 | 55% |
| 51 | 59% |
| 62 | 52% |

It is clear from these examples that cellulose in general, and corn cob cellulose in particular, can be used to reduce chlorine in potable, chlorinated drinking water. These tests have been repeated multiple times with essentially the same results.

Another preferred embodiment uses activated carbon as the chlorine adsorbent 10 to be used in the chlorine removal device 12. The mechanism of the reaction between chlorine and activated carbon is a two step process occurring at the surface of the carbon and is shown in the formula below. The first step is the rate-limiting step, that is, the migration of hypochlorite ion, $OCl^-$, to the surface of the carbon. The second step is the chemical reaction at the surface, liberating chloride ion and carbon dioxide:

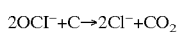

This reaction mechanism does not require conventional filtration, merely sufficient time as necessary for the rate-limiting step, the intermingling of the carbon and chlorine reactants. Because the rate at which the reaction occurs is closely related to the intermingling of carbon and chloride ions, it can be appreciated that a filtration process would tend to accelerate the reaction by helping to bring the reactants together more quickly. However, provided adequate contact time, the reaction between the chloride ions and the carbon will proceed regardless of the manner in which they come together.

For the present invention, a device which brings activated carbon into intimate contact with chlorinated water is used to dechlorinate the water without the use of a flow-through filter and without the physical limitations imposed by a flow-through filter. Several tests were completed and are summarized in the following example.

EXAMPLE 3

Granular activated carbon ("GAC") was arranged between sheets of polypropylene webbing in a plastic frame, constituting the water permeable device 12 as shown in FIG. 1. The cage was immersed in 500 ml of water containing approximately 2 ppm $OCl^-$. The concentration of free chlorine in the water was measured at one-minute intervals using a UV-Visible spectrophotometer and N,N-diethyl-p-phenylenediamine (DPD) indicator. The results are shown in Table 3, below.

TABLE 3

| Time | Absorbency | Chlorine Reduction |
| --- | --- | --- |
| 0 min. | 0.603 | 00% |
| 1 min. | 0.435 | 28% |
| 2 min. | 0.303 | 50% |
| 3 min. | 0.206 | 66% |
| 4 min. | 0.155 | 74% |
| 5 min. | 0.106 | 82% |
| 6 min. | 0.073 | 88% |

Contact between the GAC and the chlorinated water was sufficient to effect a substantial reduction in the concentration of chlorine, as shown in Table 3. This test was repeated numerous times and results substantiated.

An additional preferred embodiment was identified while studying the reaction of activated carbon with chlorine in chlorinated potable water. Activated carbon treated with a dilute aqueous solution of potassium iodide (Kl), displayed an enhanced ability to react with chlorine in water, as compared with untreated carbon. Although the potassium iodide treated product is available commercially, at the time this effect was noted the manufacturer was unaware of this enhanced property and recommended against using this product to treat chlorinated potable water. The product was formulated for air treatment applications unrelated to chlorine reduction in chlorinated potable water. Application of potassium iodide treated activated carbon to removal of gasses from air is discussed in U.S. Pat. No. 4,855,276, issued to Osborne et al. on Aug. 8, 1989.

After noting the activated carbon treated with potassium iodide had the property of reacting rapidly with chlorine in drinking water, the process was studied and reproduced. The potassium iodide additive alone was also studied, and no direct correlation between the additive and the subsequent reduction of chlorine in drinking water could be demonstrated.

Granular activated carbon can be enhanced with respect to the reaction of chlorine in chlorinated potable water by first treating the carbon with a dilute aqueous solution of potassium iodide (Kl). Excess iodide salt can be subsequently washed out of the dried, treated carbon without reducing its enhanced activity toward chlorine. The application of this process is illustrated in the following example.

EXAMPLE 4

A 10 gram sample of plain activated carbon was placed in a water permeable device 12 having a cage, as shown in FIG. 1, through which water could flow freely. The cage and sample were placed in the water reservoir 18 tank of a 12 cup coffee maker 20, as earlier described with reference to FIGS. 1 and 3. This sample was exposed to several 2.8 liter portions of water containing 2.0 ppm chlorine as $OCl^-$. Chlorine levels after brewing were measured as before described and are listed in Table 4, below.

TABLE 4

| Brew Cycles Completed | Chlorine Reduction |
| --- | --- |
| 1 | 63% |
| 2 | 11% |
| 3 | 12% |

EXAMPLE 5

Three (3) grams of potassium iodide was dissolved in 74 cc of water. An activated carbon, 97 grams, shown previously to be minimally active towards chlorine, was added to the Kl solution. After thoroughly stirring and mixing, the mixture was dried overnight at 80° C., then further dried by heating to 130° C. for about one hour.

A 20 gram sample of the treated carbon was placed in a water permeable device 12, or cage through which water could flow freely. The cage and sample were placed in the water reservoir 18 tank of a 12 cup coffee maker 20, as earlier described with reference to FIGS. 1 and 3. The sample was exposed to several 2.8 liter portions of water containing 2.0 ppm chlorine as $OCl^-$. Before treatment, the carbon essentially fails to remove chlorine after it has been used for two to three brewing cycles. Results for the Kl-treated carbon are as reported, by way of example, in Table 5:

TABLE 5

| Brew Cycles Completed | Chlorine Reduction |
| --- | --- |
| 3 | 65% |
| 5 | 55% |
| 6 | 64% |
| 10 | 53% |

The process of treating activated carbon with potassium iodide results in a remarkable increase in the adsorptive affinity of activated carbon for chlorine in potable water. This enhanced activated carbon maintains a high adsorption of chlorine for many brewing cycles. In contrast, plain activated carbon loses its adsorptive capacity after a single brewing cycle. The persistence of this effect with enhanced activated carbon is illustrated through the following example.

EXAMPLE 6

Granular activated carbon (GAC) pretreated with potassium iodide (B/S 787, 8×16 mesh, 15 grams) was placed in the cage of a water permeable device 12, the openings 14 of which allowed free flow of water to contact the GAC. As illustrated with reference to FIGS. 1 and 3, the device 12 was placed in the reservoir tank 18 of a 12 cup automatic coffee maker 20 and exposed to water 16 containing 2.0 ppm chlorine as $OCl^-$. The contact time in the reservoir was approximately nine (9) minutes. The volume used for each brewing cycle was 2.8 liters (12 cups). Chlorine content in the brewed water was measured after every ten brewing cycles.

TABLE 6

| Brewing Cycles Completed | Chlorine Reduction |
|---|---|
| 10 | 74% |
| 20 | 68% |
| 30 | 62% |
| 40 | 63% |
| 50 | 59% |
| 60 | 63% |
| 70 | 45% |
| 80 | 50% |

After exposure to 224 liters of 2.0 ppm chlorinated water, the device 12 comprising the Kl-treated GAC is still capable of reducing the chlorine content by an appreciable amount, as shown by the data of Table 6. This effect was replicated in numerous other experimental studies.

EXAMPLE 7

Five grams of ammonium carbonate was dissolved in 72 cc of water and added to 95 grams of ordinary activated carbon. The mixture was carefully stirred until uniform, and slowly dried at 80°. Complete drying was effected by heating the carbon at 130° for one hour.

In over thirty (30) successive reactions, the activated carbon produced by this process substantially removed chlorine from 2.8 liter samples of water containing 2 ppm of chlorine.

EXAMPLE 8

Five grams of ammonium sulfate was dissolved in 72 cc of water and added to 95 grams of ordinary activated carbon. The mixture was carefully stirred until uniform, and slowly dried at 80°. Complete drying was effected by heating the carbon at 130° for one hour.

The activated carbon produced by this process also substantially removed chlorine from 2.8 liter samples of water containing 2 ppm of chlorine in over thirty (30) consecutive brewing cycles.

In addition to the water permeable device 12, or cage, hereinabove described and shown in FIG. 1, the present invention is also advantageously employed through the use of a disposable bag device 26, as known in the art for tea bags, and similarly having a string 24 attached thereto for easy retrieval of the chlorine removal device from the water sample being treated. This embodiment of the invention is best illustrated in FIG. 2. The device may be provided in sizes appropriate for treatment of various volumes of water and the bag material 22 may preferably be paper or cloth; however, any of the disposable devices herein described may be made of plastic, metal, paper or cloth while maintaining its chlorine removal advantage.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

That which is claimed is:

1. A method of providing substantially dechlorinated potable water in an automatic coffee maker having a water reservoir, comprising:
   a) placing enhanced activated carbon into the water reservoir of the coffee maker;
   b) placing water in the water reservoir so that the water is in contact with the activated carbon;
   c) allowing the enhanced activated carbon to remain in contact with the water for sufficient time for substantially removing chlorine; and
   wherein the enhanced activated carbon is produced by essentially saturating activated carbon with an aqueous solution of from about 1% to 10% by weight of a compound selected from the group consisting of potassium iodide, ammonium carbonate and ammonium sulfate, followed by drying the activated carbon without reaching ignition temperature until substantially all water is evaporated therefrom.

2. The method of claim 1, wherein the enhanced activated carbon is substantially contained in a water permeable holder.

3. The method of claim 2 wherein the water permeable holder is a disposable holder.

4. The method of claim 1, further comprising the step of removing the enhanced activated carbon from the reservoir after the water is dechlorinated.

5. A method of providing chlorine-free potable water in an automatic coffee maker having a water reservoir, comprising:
   a) placing enhanced activated carbon into the water reservoir of the coffee maker;
   b) placing water in the water reservoir so that the water is in contact with the activated carbon;
   c) allowing the enhanced activated carbon to remain in contact with the water for sufficient time for substantially removing chlorine; and
   wherein the enhanced activated carbon is produced by essentially saturating activated carbon with an aqueous solution of from about 1% to 10% by weight of potassium iodide, followed by drying the activated carbon without reaching ignition temperature until substantially all water is evaporated therefrom.

6. The method of claim 5, wherein the enhanced activated carbon is substantially contained in a water permeable holder.

7. The method of claim 6 wherein the water permeable holder is a disposable product.

8. The method of claim 5, further comprising the step of removing the enhanced activated carbon from the reservoir after the water is dechlorinated.

9. A method of providing chlorine-free potable water in an automatic coffee maker having a water reservoir, comprising:
   a) placing enhanced activated carbon into the water reservoir of the coffee maker;
   b) placing water in the water reservoir so that the water is in contact with the activated carbon;
   c) allowing the enhanced activated carbon to remain in contact with the water for sufficient time for substantially removing chlorine; and
   wherein the enhanced activated carbon is produced by essentially saturating activated carbon with an aqueous solution of from about 1% to 10% by weight of ammonium carbonate, followed by drying the activated carbon without reaching ignition temperature until substantially all water is evaporated therefrom.

10. The method of claim 9, wherein the enhanced activated carbon is substantially contained in a water permeable holder.

11. The method of claim 10 wherein the water permeable holder is a disposable product.

12. The method of claim 9, further comprising the step of removing the enhanced activated carbon from the reservoir after the water is dechlorinated.

13. A method of providing chlorine-free potable water in an automatic coffee maker having a water reservoir, comprising:
   a) placing enhanced activated carbon into the water reservoir of the coffee maker;
   b) placing water in the water reservoir so that the water is in contact with the activated carbon;
   c) allowing the enhanced activated carbon to remain in contact with the water for sufficient time for substantially removing chlorine; and
   wherein the enhanced activated carbon is produced by essentially saturating activated carbon with an aqueous solution of from about 1% to 10% by weight of ammonium sulfate, followed by drying the activated carbon without reaching ignition temperature until substantially all water is evaporated therefrom.

14. The method of claim 13, wherein the enhanced activated carbon is substantially contained in a water permeable holder.

15. The method of claim 14 wherein the water permeable holder is a disposable product.

16. The method of claim 13, further comprising the step of removing the enhanced activated carbon from the reservoir after the water is dechlorinated.

17. A method of removing chlorine from potable water, comprising:
   a) placing enhanced activated carbon in the water;
   b) allowing the enhanced activated carbon to remain in contact with the water for sufficient time for substantially removing chlorine; and
   wherein the enhanced activated carbon is produced by essentially saturating activated carbon with an aqueous solution of from about 1% to 10% by weight of a compound selected from the group consisting of potassium iodide, ammonium carbonate and ammonium sulfate, followed by drying the activated carbon without reaching ignition temperature until substantially all water is evaporated therefrom.

18. The method of claim 17, further comprising the step of separating the enhanced activated carbon from the water.

19. The method of claim 17 wherein the compound selected for making the enhanced activated carbon is potassium iodide.

20. The method of claim 17 wherein the compound selected for making the enhanced activated carbon is ammonium carbonate.

21. The method of claim 17 wherein the compound selected for making the enhanced activated carbon is ammonium sulfate.

22. A method of making a substantially chlorine-free beverage, comprising:
   placing enhanced activated carbon in contact with water for a time sufficient for rendering the water substantially chlorine-free; and
   making the beverage with the substantially chlorine-free water; wherein the enhanced activated carbon is produced by essentially saturating activated carbon with an aqueous solution of from about 1% to 10% by weight of a compound selected from the group consisting of potassium iodide, ammonium carbonate and ammonium sulfate, followed by drying the activated carbon until substantially all water is evaporated therefrom.

23. A method of making a substantially chlorine-free coffee beverage, the method comprising:
   placing water in contact with enhanced activated carbon for a sufficient time to reduce chlorine content in the water so as to produce substantially dechlorinated water;
   heating the dechlorinated water; and
   placing the hot dechlorinated water in contact with a predetermined quantity of ground coffee for a sufficient time to make the substantially chlorine-free coffee beverage;
   wherein the enhanced activated carbon is produced by essentially saturating activated carbon with an aqueous solution of from about 1% to 10% by weight of a compound selected from the group consisting of potassium iodide, ammonium carbonate and ammonium sulfate, followed by drying the activated carbon until substantially all water is evaporated therefrom.

* * * * *